US009680967B2

(12) United States Patent
Kim et al.

(10) Patent No.: US 9,680,967 B2
(45) Date of Patent: Jun. 13, 2017

(54) METHOD OF USING APPLICATION, GATEWAY USING THE METHOD, TERMINAL USING THE METHOD, AND TERMINAL SYSTEM USING THE METHOD

(71) Applicant: SAMSUNG ELECTRONICS CO., LTD., Gyeonggi-do (KR)

(72) Inventors: Sei-kwon Kim, Yongin-si (KR); Eun Namgung, Hwaseong-si (KR); Man-seok Kang, Yongin-si (KR); Keun-seob Kim, Suwon-si (KR); Tae-jeoung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 758 days.

(21) Appl. No.: 13/680,319

(22) Filed: Nov. 19, 2012

(65) Prior Publication Data

US 2013/0132467 A1 May 23, 2013

(30) Foreign Application Priority Data

Nov. 18, 2011 (KR) ........................ 10-2011-0121195

(51) Int. Cl.
| | |
|---|---|
| *H04L 29/06* | (2006.01) |
| *H04L 29/08* | (2006.01) |
| *G06F 9/48* | (2006.01) |
| *G06F 9/50* | (2006.01) |

(52) U.S. Cl.
CPC ............ *H04L 67/42* (2013.01); *G06F 9/4843* (2013.01); *G06F 9/5055* (2013.01); *H04L 67/28* (2013.01); *H04L 67/34* (2013.01)

(58) Field of Classification Search
CPC ................................ H04L 67/42; H04L 67/10
USPC .................................. 709/203; 715/808, 846
See application file for complete search history.

(56) References Cited

U.S. PATENT DOCUMENTS

| | | | |
|---|---|---|---|
| 6,117,187 A * | 9/2000 | Staelin | ......................... 717/169 |
| 6,769,009 B1 * | 7/2004 | Reisman | .................. G06F 8/65 |
| | | | 705/27.1 |
| 8,200,962 B1 * | 6/2012 | Boodman | ............... G06F 21/53 |
| | | | 713/161 |
| 8,307,003 B1 * | 11/2012 | Sheth et al. | .................. 707/790 |
| 9,497,284 B2 * | 11/2016 | Afergan | ............ G06F 17/30902 |
| 2002/0129129 A1 * | 9/2002 | Bloch et al. | .................. 709/220 |
| 2005/0154759 A1 * | 7/2005 | Hofmeister | ............... G06F 8/61 |
| 2008/0034119 A1 * | 2/2008 | Verzunov et al. | ............ 709/247 |
| 2008/0046616 A1 * | 2/2008 | Verzunov et al. | .............. 710/68 |
| 2010/0179942 A1 * | 7/2010 | Wallis | ....................... G06F 8/63 |
| | | | 707/640 |
| 2010/0251242 A1 * | 9/2010 | Sivasubramanian et al. | ............................ 718/100 |

(Continued)

FOREIGN PATENT DOCUMENTS

KR 2003-0066838 A 8/2003

*Primary Examiner* — Douglas Blair
(74) *Attorney, Agent, or Firm* — Sughrue Mion, PLLC

(57) ABSTRACT

Provided is a method of using an application, the method including: requesting to transmit a predetermined application from at least one terminal; storing the predetermined application which is decompressed according to a request to transmit the predetermined application, in a storage device; extracting a script file which manages execution of the predetermined application from the decompressed predetermined application; and updating a list of applications stored in the storage device using the script file.

23 Claims, 12 Drawing Sheets

(56) References Cited

U.S. PATENT DOCUMENTS

| | | | | |
|---|---|---|---|---|
| 2010/0281112 A1* | 11/2010 | Plamondon | ................... | 709/203 |
| 2011/0004874 A1* | 1/2011 | Nakashima | ................... | 717/175 |
| 2011/0010699 A1* | 1/2011 | Cooper | ................... | G06F 21/12 |
| | | | | 717/169 |
| 2011/0145313 A1* | 6/2011 | Narayanan et al. | ........... | 709/203 |
| 2011/0153696 A1* | 6/2011 | Saxena et al. | ............... | 707/827 |
| 2011/0208857 A1* | 8/2011 | Gentile et al. | ................ | 709/224 |
| 2011/0238737 A1* | 9/2011 | Agrawal et al. | .............. | 709/203 |
| 2012/0089906 A1* | 4/2012 | Reeves | ............... | H04L 67/1095 |
| | | | | 715/255 |
| 2012/0159468 A1* | 6/2012 | Joshi | ......................... | G06F 8/71 |
| | | | | 717/172 |
| 2012/0203880 A1* | 8/2012 | Kluyt et al. | .................. | 709/223 |
| 2013/0160126 A1* | 6/2013 | Kapoor et al. | .................. | 726/24 |
| 2013/0226992 A1* | 8/2013 | Bapst et al. | ................... | 709/203 |
| 2014/0012949 A1* | 1/2014 | Meyers | ............... | H04L 67/1095 |
| | | | | 709/217 |
| 2016/0342411 A1* | 11/2016 | Cooper | ................... | G06F 21/12 |

* cited by examiner

FIG. 9

```
{
  "name": "Google Mail",          ─910
  "description": "Read your gmail",
  "version": "1",
  "app": {
    "urls": [
      "*://mail.google.com/mail/",
      "*://www.google.com/mail/"
    ],
    "launch": {
      "web_url": "http://mail.google.com/mail/"   ─920
    }
  },
  "icons": {
    "128": "icon_128.png"          ─930
  },
  "permissions": [
    "unlimitedStorage",
    "notifications"
  ]
}
```
900

FIG. 10

```
                                              1000
{
  "name": "My Awesome Racing Game",            — 1010
  "description": "Enter a world where a Vanagon can beat a Maserati",
  "version": "1",
  "app": {
    "launch": {
      "local_path": "main.html"                — 1020
    }
  },
  "icons": {
    "16": "icon_16.png",                       — 1030
    "128": "icon_128.png"
  }
}
```

FIG. 11

```
                                    ,—1100
<?xml version="1.0" encoding="UTF-8"?>
<widget xmlns    = "http://www.w3.org/ns/widgets"
        id       = "http://example.org/exampleWidget"
        version  = "2.0 Beta"
        height   = "200"
        width    = "200"
        viewmodes = "fullscreen">

<name short="Example 2.0">
    The example Widget!            —1110
  </name>

<feature name="http://example.com/camera">
    <param name="autofocus" value="true"/>

</feature>

<preference name    = "apikey"
              value   = "ea31ad3a23fd2f"
              readonly = "true" />

<description>
    A sample widget to demonstrate some of the possibilities.
  </description>

<author href = "http://foo-bar.example.org/"
          email = "foo-bar@example.org">Foo Bar Corp</author>
  <icon src="icons/boo.png"/>          —1120
  <content src="myWidget.html"/>       —1130
</widget>
```

METHOD OF USING APPLICATION, GATEWAY USING THE METHOD, TERMINAL USING THE METHOD, AND TERMINAL SYSTEM USING THE METHOD

CROSS-REFERENCE TO RELATED APPLICATION

This application claims priority from Korean Patent Application No. 10-2011-0121195, filed on Nov. 18, 2011, in the Korean Intellectual Property Office, the disclosure of which is incorporated herein in its entirety by reference.

BACKGROUND

1. Field

Apparatuses and methods consistent with the exemplary embodiments relate to using an application, a gate using the method, a terminal using the method, and a communication system using the method, and more particularly, to a method of using a web application received from a predetermined web server via a network, a gate using the method, a terminal using the method, and a communication system using the method.

2. Description of the Related Art

Recently, terminals such as smartphones, personal digital assistants (PDAs), tablets, personal computers (PCs), tablet type terminals or the like are being rapidly supplied. Accordingly, development of applications executable on these terminals has accelerated, and many applications are being launched. As disclosed herein, applications provided on a web server are referred to as web applications. The web applications are compressed in different forms according to models or types of terminals that receive the web applications.

Moreover, as wired or wireless network technology is developed, internet networks or server systems using internet networks are also gradually being developed. Accordingly, computing devices including terminals such as smartphones, PDAs, PCs, tablet type terminals or the like are dependent on web networks. For example, a user who uses a smartphone may receive web applications from an application provider and use the web application.

In general, web applications are provided via a browser. Also, mobile terminals use different browsers according to manufacturers, models, or product specifications. Accordingly, web applications used in a terminal cannot be used in other terminals that use a different browser from that of the terminal. Due to this browser dependency of web applications, open platforms cannot be implemented.

Accordingly, a method of using applications while guaranteeing compatibility between web applications and a mobile terminal using the same are required. In addition, a method for a plurality of mobile terminals to use web applications more conveniently, a gateway using the method, a terminal using the method, and a communication system using the method are provided.

SUMMARY

An exemplary embodiment provides a method of using an application that may be commonly used by different terminals, a gateway using the method, a terminal using the method, and a communication system using the method.

An exemplary embodiment provides a method of using an application that is independent from a browser or an operating system, a gateway using the method, a terminal using the method, and a communication system using the method.

An exemplary embodiment provides a method of using web applications more conveniently, a gateway using the method, a terminal using the method, and a communication system using the method.

According to an aspect of an exemplary embodiment, there is provided a method of using an application, the method comprising: requesting to transmit a predetermined application, wherein the request is performed by at least one terminal; storing the predetermined application which is decompressed in a storage device according to the request to transmit the predetermined application; extracting a script file which manages execution of the predetermined application from the decompressed predetermined application; and updating a list of applications stored in the storage device using the script file.

The extracting the script file comprises extracting a manifest file included in the decompressed predetermined application.

The storing the predetermined application in the storage device comprises storing the decompressed predetermined application in a cloud server.

The decompressed predetermined application has a data format independent from a browser installed in the at least one terminal.

The decompressed predetermined application has a data format independent from a browser installed in the at least one terminal and is at least one selected from the group comprising Internet Explorer, Opera, Chrome, Chromium, Firefox, and Dolphin.

The decompressed predetermined application has a data format independent from an operating system installed in the at least one terminal.

The method may further comprise: receiving the request to transmit the predetermined application via a gateway and transmitting the received request to transmit the predetermined application to an application provision server; receiving the predetermined application from the application provision server via the gateway; and decompressing the predetermined application via at least one of the gateway and the storage device.

The decompressing the predetermined application may comprise: transmitting the predetermined application to the storage device via the gateway; and decompressing the predetermined application via the storage device.

The extracting the script file may comprise extracting a script file via at least one of the gateway and the storage device.

The method may further comprise: requesting to transmit the list of applications from the at least one terminal to the gateway; and outputting a user interface displaying the list of applications and selecting at least one of the applications stored in the storage device, via the at least one terminal.

The method may further comprise requesting the gateway to execute an application selected via the user interface by the at least one terminal.

The method may further comprise: receiving the application from the application provision server via the gateway according to the request to execute the application; and receiving and executing the application transmitted from the gateway via the at least one terminal.

The method may further comprise: receiving the request to transmit the predetermined application from the at least one terminal via an application provision server; and receiving the predetermined application from the application provision server via the at least one terminal. The method may further comprise: decompressing the predetermined application via the at least one terminal; and transmitting the decompressed predetermined application to the storage device.

The extracting the script file may comprise extracting the script file from the decompressed predetermined application, and wherein the updating the list of applications may comprise updating the list using the script file via the storage device.

The method may further comprise: requesting to transmit an app list of applications provided by an application provision server, via the at least one terminal; receiving the app list according to the request to transmit the app list, via the at least one terminal; and selecting at least one application included in the app list from the predetermined application.

According to another aspect of an exemplary embodiment, there is provided a gateway comprising: an interface unit receiving a request to transmit a predetermined application from at least one terminal; and a control unit configured to: receive the predetermined application from an application provision server according to the request to transmit the predetermined application; decompress the predetermined application and store the decompressed predetermined application in a storage device; and extract a script file which manages execution of the predetermined application from the decompressed predetermined application to update a list of applications stored in the storage device.

The storage device may be a cloud server.

The script file may be a manifest file.

The decompressed predetermined application may be data that is written in at least one selected from the group comprising Markup Language, Javascript, and Cascading Style Sheet (CSS).

The control unit may generate a menu page including the list of applications from which at least one of applications stored in the storage device is selected.

The list of applications may comprise at least one selected from the group comprising an icon, an identification mark, location information of the application, and an application name corresponding to an application.

The predetermined application may be a web application.

The gateway may be included in the storage device.

When the control unit receives a request to execute the predetermined application from the at least one terminal, the control unit may determine whether the at least one terminal, which has requested execution of the predetermined application, has same identification information as a user of the at least one terminal that has requested transmission of the predetermined application.

When the at least one terminal, which has requested execution of the predetermined application, has the same identification information corresponding to the user of the at least one terminal that has requested transmission of the predetermined application, the control unit may transmit the decompressed predetermined application to the at least one terminal that has requested transmission of the predetermined application.

According to another aspect of an exemplary embodiment, there is provided a terminal comprising: a control unit generating a transmission request signal for requesting transmission of a predetermined application; and an interface unit transmitting the transmission request signal to an application provision server and receiving a list of applications stored in a storage device. The transmission request signal is a signal which requests storage of the predetermined application in the storage device. The list of applications is updated using a script file extracted from the predetermined application.

According to another aspect of an exemplary embodiment, there is provided a storage device comprising: a storage unit storing a decompressed predetermined application according to a request to transmit a predetermined application; and a control unit extracting a script file for managing execution of the predetermined application from the decompressed predetermined application and updating a list of applications stored in the storage unit by using the script file.

According to another aspect of an exemplary embodiment, there is provided a communication system comprising: at least one terminal requesting a gateway to transmit a predetermined application; a gateway receiving the predetermined application from an application provision server, decompressing the received predetermined application, extracting a script file for managing execution of the predetermined application from the decompressed predetermined application, and updating a list of applications stored in a storage device by using the script file; and a storage device storing the decompressed predetermined application.

BRIEF DESCRIPTION OF THE DRAWINGS

The above and other features will become more apparent by describing in detail exemplary embodiments thereof with reference to the attached drawings in which:

FIG. 9 is a view for explaining an updated second app list;

FIG. 10 is a view for explaining a script file extracted in a method of using an application according to another exemplary embodiment;

FIG. 11 is a view for explaining a script file extracted in a method of using an application according to another exemplary embodiment;

DETAILED DESCRIPTION

Hereinafter, exemplary embodiments will be described in detail by explaining exemplary embodiments with reference to the attached drawings. Expressions such as "at least one of," when preceding a list of elements, modify the entire list of elements and do not modify the individual elements of the list.

Applications (Apps) are application programs that are executable on a computing device including a terminal and are used to perform predetermined functions. Currently, as terminals are widely supplied, many applications are being released and developed. Examples of the terminal include smartphones, personal digital assistants (PDAs), personal computers (PCs), and tablet type terminals, and any computing device that is capable of executing applications. Also, the terminal may be a portable mobile terminal or a non-portable terminal.

Web applications may be written using programs or data generation languages such as Markup Language, Javascript, or Cascading Style Sheet (CSS). An example of a Markup Language is Hypertext Mark-up Language (HTML). Also, web applications may be generated in a compression file format that is dependent upon a browser or an operating system (OS) installed in a terminal. That is, web applications have different compression file formats according to browsers or OSs.

In general, a mobile terminal using a predetermined browser may use a predetermined web application compressed in a compression format dependent upon a predetermined browser. In detail, a mobile terminal using Internet Explorer may use predetermined web applications that are compressed in a compression method corresponding to Internet Explorer, but may not use web applications compressed in a compression method corresponding to Chrome.

A method of using an application, in which predetermined web applications may be used regardless of a browser or an OS so that web applications are used more conveniently, a gate using the method, a terminal using the method, and a communication system using the method will be described in detail with reference to attached drawings.

Figure 1:
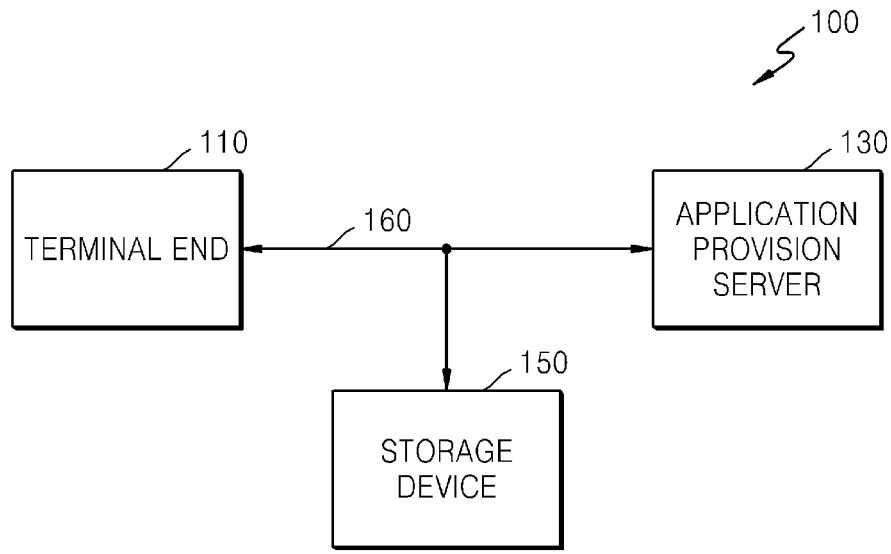
FIG. 1 is a block diagram illustrating a communication system according to an exemplary embodiment.

FIG. 1 is a block diagram illustrating a communication system 100 according to an exemplary embodiment.

Referring to FIG. 1, the communication system 100 includes a terminal end 110, an application provision server 130, and a storage device 150. Also, the terminal end 110 may include at least one terminal (not shown) according to an exemplary embodiment. The terminal (not shown) included in the terminal end 110 will be described in detail later with reference to FIGS. 3A and 3B.

The terminal end 110 includes at least one terminal (not shown) that requests to send a predetermined application. In detail, the at least one terminal (not shown) may include a mobile terminal or an electronic device which is a computing device capable of executing a predetermined program or a predetermined application. Examples of mobile terminals include a smartphone, a PDA, a PC, a tablet type terminal, a mobile game player, and an electronic dictionary. Also, examples of the electronic device include a computer, a set-top box, a smart TV, and a home network system.

In addition, a mobile terminal or an electronic device included in the terminal end 110 may execute a predetermined application which is a web application provided by the application provision server 130.

The application provision server 130 provides at least one application. In detail, the application provision server 130 is an application provider that distributes a web application via a wired or wireless network. That is, the at least one application may be a web application.

While one application provision server 130 is illustrated as an application provider in FIG. 1, the communication system 100 may include a plurality of application provision servers.

The storage device 150 stores a predetermined application which is decompressed according to a request to transmit a predetermined application by the mobile terminal (not shown) included in the terminal end 110.

In detail, the storage device 150 stores a decompressed, predetermined application, and may include a cloud server (not shown) that is connected to the terminal end 110 and the application provision server 130 via a wired/wireless network 160. For example, the wired/wireless network 160 may be an internet network. In detail, the terminal end 110, the application provision server 130, and the storage device 150 may be connected to one another via the wired/wireless network 160, and data may be transmitted or received via the wired/wireless network 160.

In addition, the storage device 150 may store a decompressed, predetermined application having a data format independent from a browser installed in the terminal (not shown) included in the terminal end 110. Alternatively, the storage device 150 may store a decompressed, predetermined application having a data format independent from an OS installed in the at least one terminal (not shown) included in the terminal end 110.

In detail, when a terminal (not shown) requests to transmit a predetermined application, the application provision server 130 may transmit the predetermined application to at least one of the terminal (not shown) of the terminal end 110 and the storage device 150. The predetermined application output from the application provision server 130 may have a compressed data format. In detail, data output from the application provision server 130 may be compressed in different formats according to browsers of the terminal (not shown) included in the terminal end 110. In addition, data of the predetermined application output from the application provision server 130 may be compressed in different formats according to OSs of the terminal (not shown).

The at least one of the terminal (not shown) of the terminal end 110 and the storage device 150 may decompress the received predetermined application and store the same in the storage device 150. For example, the decompressed application may be data having a format of a program generation language, such as HTML, Javascript, or CSS. That is, when the application provision server 130 provides application data compressed according to browsers, at least one of the terminal (not shown) of the terminal end 110 and the storage device 150 may decompress the application data according to the browsers and generate decompressed application data having a data format such as HTML, Javascript, or CSS, as described above.

Also, examples of the browser installed in the terminal (not shown) include Internet Explorer, Opera, Chrome, Chromium, Firefox, and Dolphin. For example, the decompressed application described above may have a data format that is independent from a browser including at least one of Internet Explorer, Opera, Chrome, Chromium, Firefox, and Dolphin.

In the communication system 100, the decompressed application data is stored in the storage device 150 so that different types of terminals which use different browsers may commonly use predetermined applications. Accordingly, the predetermined applications may be used independently from browsers.

Figure 2:
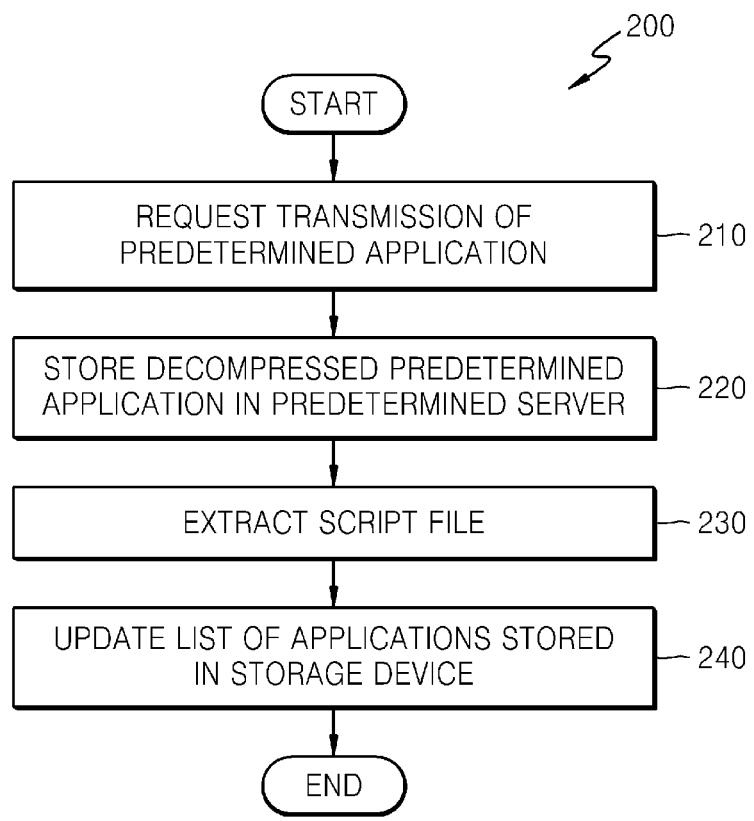
FIG. 2 is a flowchart illustrating a method of using an application according to an exemplary embodiment.

FIG. 2 is a flowchart illustrating a method 200 of using an application according to an exemplary embodiment. The method 200 may be performed using at least one of the terminal (not shown), the storage device 150, and the communication system 100 according to an exemplary embodiment. Accordingly, the description already provided with reference to FIG. 1 will not be repeated, and the method 200 using an application will be described in detail below with reference to FIGS. 1 and 2.

Referring to FIG. 2, in operation 210, a terminal (not shown) requests transmission of a predetermined application. The terminal (not shown) may request the application provision server 130 to transmit a predetermined application. Also, if the communication system 100 further includes a gateway (not shown), the terminal may request the gateway to transmit a predetermined application. The gateway will be described in detail later with reference to FIGS. 6 through 13.

Operation 210 may be performed in the terminal (not shown) included in the terminal end 110. In detail, the terminal (not shown) included in the terminal end 110 outputs a request to transmit a predetermined application, and the request to transmit a predetermined application may be transmitted to at least one of the application provision server 130 and a gateway 670 which will be described later with reference to FIG. 6.

In operation 220, a predetermined application that is decompressed according to the request to transmit a predetermined application generated in operation 210 is stored in the storage device 150 which is different from the terminal (not shown). In detail, the decompressed predetermined application may be stored in a cloud server (not shown). Operation 220 may be performed in the storage device 150.

In detail, when the application provision server 130 receives a request to transmit a predetermined application, the predetermined application is transmitted to at least one of the terminal (not shown) included in the terminal end 110, the storage device 150, and the gateway 670, which will be described with reference to FIG. 6. At least one of the terminal (not shown), the storage device 150, and the gateway 670 receives the predetermined application from the application provision server 130 and decompresses data of the received predetermined application. In addition, at least one of the terminal (not shown), the storage device 150, and the gateway 670 may store the decompressed predetermined application in the storage device 150.

Moreover, the decompressed predetermined application may have a data format that is independent from a browser installed in the terminal, such as Internet Explorer, Opera, Chrome, Chromium, Firefox, and Dolphin.

Alternatively, the decompressed predetermined application may have a data format that is independent from an OS installed in the terminal.

In operation 230, a script file is extracted from the decompressed predetermined application of operation 220 in order to control execution of the predetermined application. Operation 230 may be performed in at least one of the terminal (not shown), the storage unit 150, and the gateway 670. A script file will be described in detail later with reference to FIGS. 9 through 11.

In operation 240, a list of applications stored in the storage device 150 using the extracted script file of operation 230 is updated. Operation 240 may be performed in at least one of the storage device 150 and the gateway 670.

According to the method 200 of using an application, decompressed applications are stored in the storage device 150 which is accessible by a plurality of terminals so that the plurality of terminals having different browsers or different OSs may access the storage device 150 and easily use the applications. Furthermore, according to the method 200, the list of applications stored in the storage device 150 is continuously updated, thereby allowing the terminal to use the applications more conveniently.

Figure 3A:
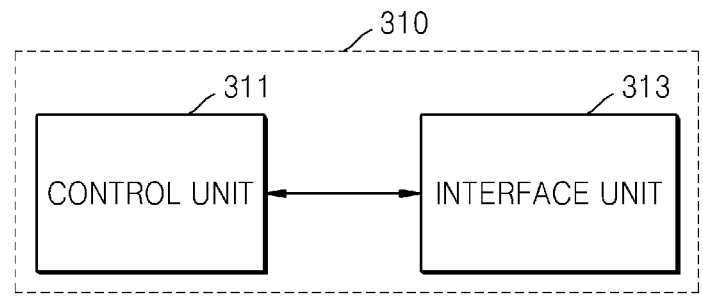
FIGS. 3A and 3B are block diagrams illustrating terminals according to an exemplary embodiment.
Figure 3B:
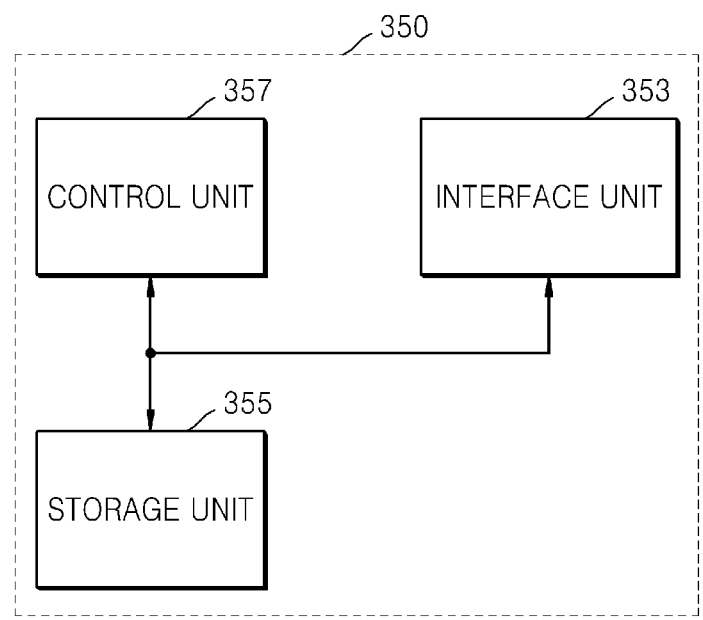

FIGS. 3A and 3B are block diagrams illustrating terminals according to an exemplary embodiment. In detail, FIG. 3A illustrates a terminal 310 according to an exemplary embodiment, and FIG. 3B illustrates a terminal 350 according to another exemplary embodiment, which is a detailed view of the terminal 310 of FIG. 3A. Also, the terminal 310 and the terminal 350 may be included in the terminal end 110 described above with reference to FIG. 1.

Referring to FIG. 3A, the terminal 310 includes a control unit 311 and an interface unit 313.

The control unit 311 generates a transmission request signal for requesting transmission of a predetermined application. The transmission request signal generated by the control unit 311 is transmitted to at least one of the application provision server 130 and the gateway 670 via the interface unit 313.

The transmission request signal is a signal used to request that a decompressed predetermined application be stored in the storage device 150. That is, the decompressed predetermined application is stored according to the transmission request signal, in the storage device 150 that is external to the terminal 310.

The interface unit 313 transmits the transmission request signal generated in the control unit 311 to at least one of the application provision server 130 and the gateway 670. Also, the interface unit 313 receives the list of applications stored in the storage device 150. The list of applications is a list that is updated using a script file extracted from a decompressed predetermined application. In addition, transmission or reception of data with an external device including at least one of the application provision server 130, the storage device 150, and the gateway 670 is conducted via the interface unit 313.

In detail, when a user requests the control unit 311 to download a predetermined application via a user interface (not shown), the control unit 311 accordingly generates a transmission request signal for requesting transmission of a predetermined application. Also, the control unit 311 may control in such a manner that the transmission request signal is transmitted to at least one of the application provision server 130 and the gateway 670 via the interface unit 313. Also, when the transmission request signal is received by the gateway 670, the gateway 670 may transmit the transmission request signal to the application provision server 130.

Accordingly, the application provision server 130 may receive the transmission request signal directly from the terminal 310 or via the gateway 670. In addition, in response to the received transmission request signal, the predetermined application may be transmitted to at least one of the gateway 670, the terminal 310, and the storage device 150. The at least one of the gateway 670, the terminal 310, and the storage device 150 that has received the predetermined application decompresses the received predetermined application, and stores the decompressed predetermined application in the storage device 150, that is, in an internally included cloud server (not shown).

Referring to FIG. 3B, compared to the terminal 310 illustrated in FIG. 3A, the terminal 350 may further include a storage unit 355. The rest of the configurations of the terminal 350 are the same as the terminal 310 of FIG. 3A, and thus the description already provided with reference to FIG. 3A will not be repeated here.

The storage unit 355 may store various types of data or programs according to control by the control unit 357. In detail, when the terminal 350 receives a predetermined application according to the transmission request signal generated in the control unit 357, the control unit 357 stores the application in the storage unit 355. Also, when the control unit 357 decompresses the predetermined application, the decompressed application may be temporarily stored in the storage unit 355. The decompressed application that is temporarily stored in the storage unit 355 may be transmitted to the storage device 150 via the interface unit 353. Also, the storage unit 355 may store various programs that are required in necessary or auxiliary operations such as executing applications of the terminal 350 or transmitting or receiving data.

Figure 4:
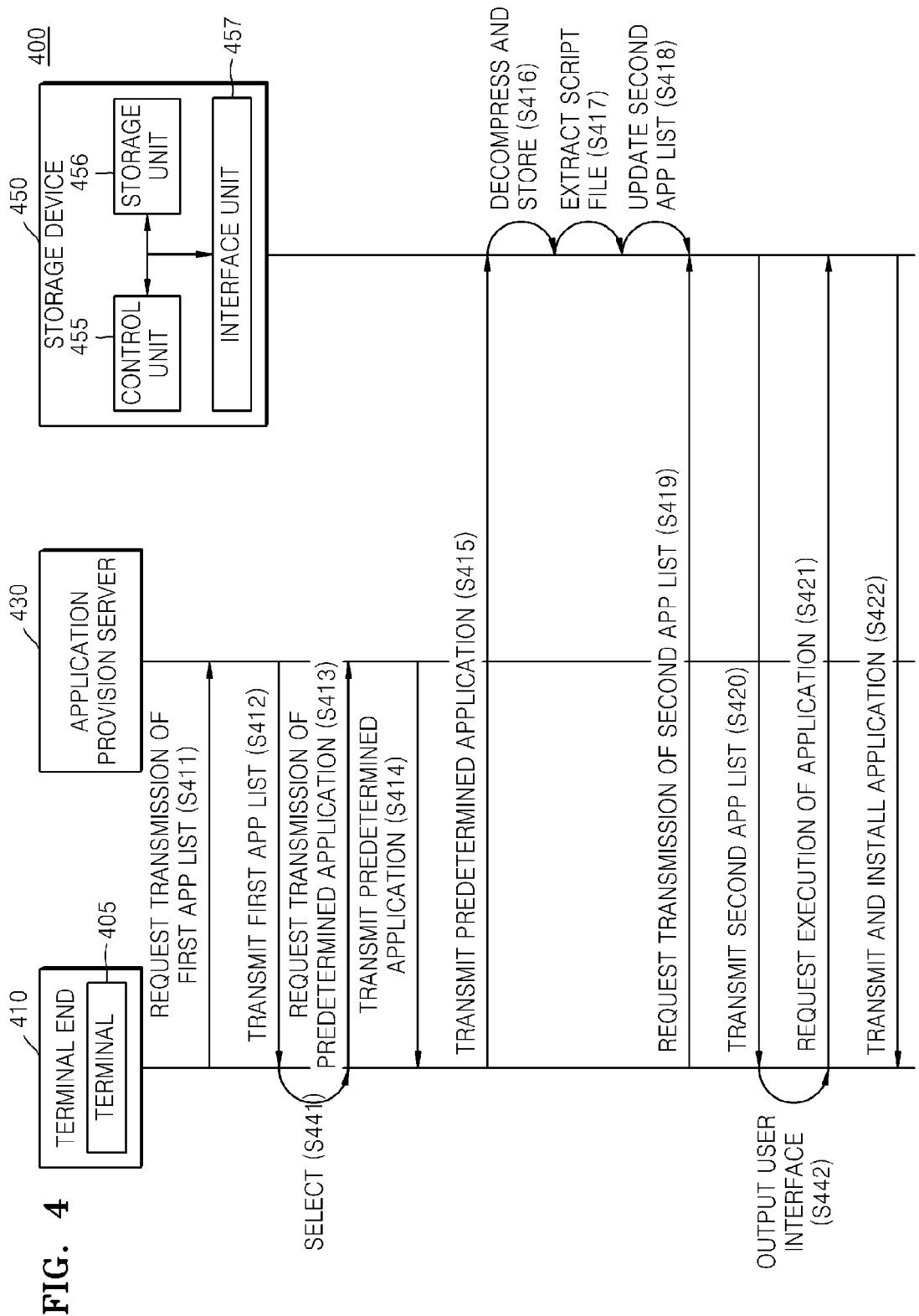
FIG. 4 is a flowchart illustrating a method of using an application according to another exemplary embodiment.

FIG. 4 is a flowchart illustrating a method 400 of using an application according to another exemplary embodiment. The method 400 may be performed in the communication system 100 described with reference to FIG. 1 or using the terminal 310 and the terminal 350 described with reference to FIGS. 3A and 3B. Also, a terminal end 410, an application provision server 430, and a storage device 450 illustrated in FIG. 4 respectively correspond to the terminal end 110, the application provision server 130, and the storage device 150 of FIG. 1. Also, the terminal 405 corresponds to, for example, terminal 310 and terminal 350 of FIGS. 3A and 3B, respectively.

Thus, the description already provided with reference to FIGS. 1, 3A and 3B will not be repeated here.

Also, the storage device 450 may further include a control unit 455 and a storage unit 456. Also, the storage device 450 may further include an interface unit 457.

The interface unit 457 receives a predetermined application provided from the application provision server 430. In detail, the interface unit 457 may receive a predetermined application from the application provision server 430 or the terminal 405.

The storage unit 456 stores the predetermined application that is decompressed according to a request to transmit a predetermined application.

The control unit 455 extracts a script file for managing execution of a predetermined application from the decompressed predetermined application, and updates a list of applications stored in the storage unit 456 by using the script file. Also, the control unit 455 may decompress a predetermined application.

The method 400 includes operations S413, S414, S415, S416, S417, and S418; and operation S413 corresponds to operation S210 of FIG. 2, operations S414, S415, and S416 correspond to operation S220 of FIG. 2, operation S417 corresponds to operation S230, and operation S418 corresponds to operation S240 of FIG. 2. Thus, the description already provided with reference to FIG. 2 will not be repeated here.

Also, the method 400 may further include at least one of operations S411, S412, S419, S420, S421, S422, S441, and S442 as illustrated in FIG. 4. The method 400 will be described in detail below with reference to FIG. 4. At least one terminal is included in the terminal end 410 and, according to the exemplary embodiment of FIG. 4, the terminal 405 is included in the terminal end 410.

Referring to FIG. 4, in operation S413, the terminal 405 requests the application provision server 430 to transmit a predetermined application. In detail, operation S413 may be performed in the terminal 405, that is, according to control by the control unit 311 or 357 of the terminal 405.

In response to the request of operation S413, in operation S414, the application provision server 430 transmits a predetermined application to the terminal 405. In detail, the terminal 405 may receive the predetermined application transmitted from the application provision server 430 via the interface unit 353 and temporarily stores the predetermined application in the storage unit 355. The predetermined application transmitted in operation S414 may have a compressed data format as described above.

In operation S415, the terminal 405 transmits the predetermined application received in operation S414 to the storage device 450. In detail, the interface units 313 and 353, as shown in FIGS. 3A and 3B, of the terminal 405 may transmit the predetermined application received in operation S415 to the storage device 450 according to a control of the control unit 311 or 357.

In operation S416, the storage device 450 decompresses the predetermined application transmitted in operation S415 and stores the decompressed predetermined application. In detail, in operation S416, the interface unit 457 receives the predetermined application, and the control unit 455 decompresses the received predetermined application and stores the decompressed predetermined application in the storage unit 456.

In addition, the method 400 may further include operation S411 in which the terminal 405 requests the application provision server 430 to transmit a first App list. The first App list refers to an application list containing applications provided by the application provision server 430.

In response to the request of operation S411, the application provision server 430 transmits the first App list to the terminal 405 in operation S412. By using the first App list received in operation S412, the user may select applications to be downloaded, in operation S441. Transmission requests for the selected applications may be made in the following operation S413. That is, in operation S413, the terminal 405 may request transmission of a predetermined application which is at least one application included in the first App list transmitted in operation S412.

Also, in operation S416, when the decompressed predetermined application is stored in the storage device 450, the storage device 450 may update a second App list which reflects the stored decompressed predetermined application, in operation S418. In detail, a script file may be extracted from the decompressed predetermined application in operation S417, and in operation S418, the second App list may be updated by using the script file extracted in operation S417.

Here, the second App list refers to a list of applications stored in the storage device 450. That is, the second App list may be a list including items respectively corresponding to applications stored in the storage device 450, and the items may comprise names of the applications, identification marks, location information of the applications via which the applications may be accessed, and icons indicating the applications, etc. Operation 418 will be described later in detail with reference to FIGS. 8 through 12.

Also, the method 400 may further include operations S419, S420, and S442. At least one of the terminal 405 or another terminal included in the terminal end 410 may request the storage device 450 to transmit a second App list in operation S419.

According to the request of operation S419, the storage device 450 transmits the second App list to a terminal, from which the request of operation S419 is output, in operation S420. Accordingly, a terminal included in the terminal end 410, for example, the terminal 405, may select at least one application by using the second App list, and may request the storage device 450 to execute the application selected in operation S420.

In detail, the terminal 405, which has received the second App list, may output a user interface via which at least one of applications stored in the storage device 450 may be selected in operation S442. The user may select at least one application included in the second App list via the user interface output in operation S442.

In operation S421, at least one of the terminal 405 included in the terminal end 410 may request the storage device 450 to execute an application. The application that is requested in operation S421 to be executed may be a predetermined application stored in operation S416 or at least one of an application that is already stored in the storage device 450. In addition, the application that is requested to be executed in operation S421 may be an application selected in operation S442. Operation S421 may be performed according to control by the control unit 311 and the control unit 357 of the terminal 405.

In response to the request received in operation S421, in operation S422, the storage device 450 transmits a requested application to the terminal 405, from which the request of operation S421 is output. The terminal 405, from which the request of operation S421 is output, may receive an application received in operation S422 and execute the received application.

Figure 5:
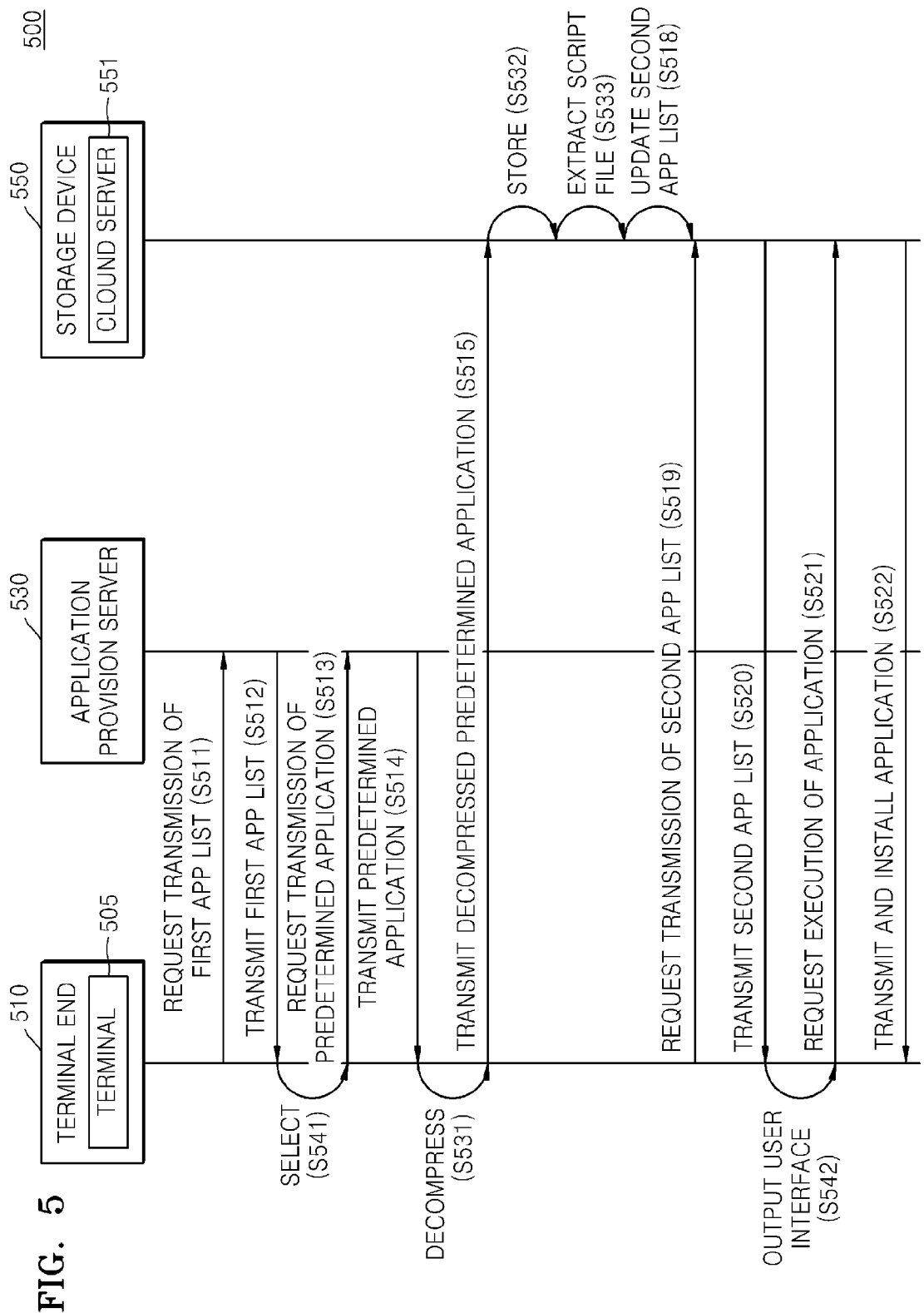
FIG. 5 is a flowchart illustrating a method of using an application according to another exemplary embodiment.

FIG. 5 is a flowchart illustrating a method 500 of using an application according to another exemplary embodiment. A terminal end 510, an application provision server 530, and a storage device 550 of FIG. 5 respectively correspond to the terminal end 410, the application provision server 430, and the storage device 450 of FIG. 4. Also, operations S511, S512, S541, S513, S514, S533, S518, S519, S520, S542, S521, and S522 respectively correspond to operations S411, S412, S441, S413, S414, S417, S418, S419, S420, S442, S421, and S422 of the method 400. Thus, the description provided with reference to FIG. 4 above will not be repeated here.

Referring to FIG. 5, the method 500 is different from operations S415 and S416 of the method 400 in terms of decompressing and storing a predetermined application in operations S531, S515, and S532.

In operation S531, a terminal 505 in the terminal end 510, from which a request of operation S513 is output, decompresses a predetermined application that is received in operation S514. The decompression of operation S531 may be performed by using the control units 311 and 357 of the terminal 310 and the terminal 350, and the decompressed application may be temporarily stored in the storage unit 355.

In operation S515, the predetermined application decompressed in operation S531 is transmitted to the storage device 550. Operation S515 may be performed according to control by the control unit 311 and the control unit 357 of the terminal 310 and the terminal 350, respectively.

In operation S532, the storage device 550, for example, a cloud server 551, stores the decompressed application that is received in operation S515.

Figure 6:
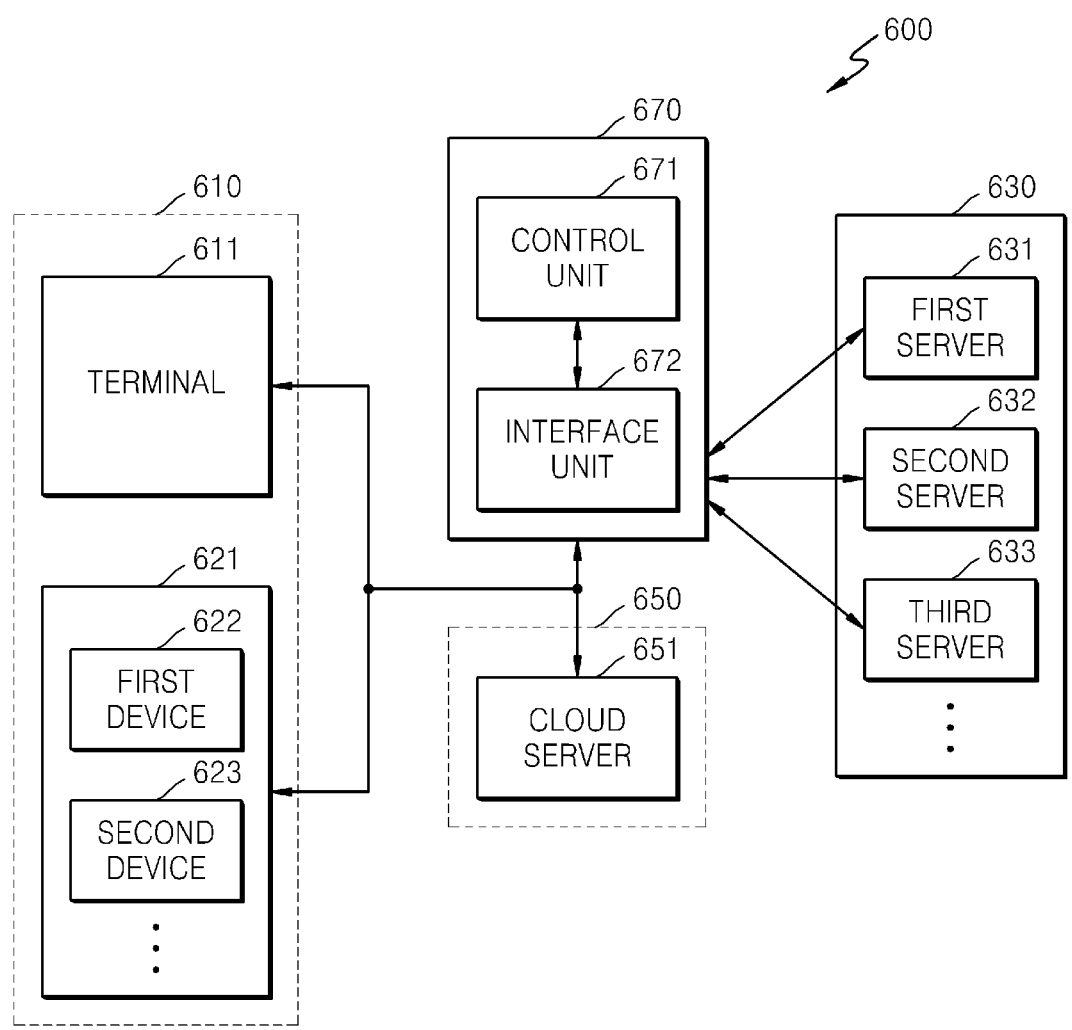
FIG. 6 is a block diagram illustrating a gateway and a communication system according to an exemplary embodiment.

FIG. 6 is a block diagram illustrating a gateway 670 and a communication system 600 according to another exemplary embodiment. The communication system 600 includes a terminal end 610, an application provision server 630, a storage device 650, and a gateway 670 according to an exemplary embodiment. The terminal end 610, the application provision server 630, and the storage device 650 included in the communication system 600 respectively correspond to the terminal end 110, the application provision server 130, and the storage device 150 included in the communication system 100 of FIG. 1. Also, a terminal 611 and other terminals 622 and 623 which are included in the terminal end 610 respectively correspond to the terminal 310 and the terminal 350 described with reference to FIGS. 3A and 3B. Accordingly, with regard to the communication system 600, the description already provided with reference to FIGS. 1 and 3 will not be repeated here.

The terminal end 610 includes at least one terminal 611 and at least one of other terminals, such as, an electronic device 621. For example, the terminal 611 may be a smartphone, and the electronic device 621 may be a computing device capable of executing an application and may include first and second devices 622 and 623, for example. For example, the first and second devices 622 and 623 may be electronic devices such as a pad type terminal or a laptop computer. Hereinafter, the terminal 611 and the electronic device 621 will be referred to as 'terminals.'

Also, terminals included in the terminal end 610 may all be owned by one user. In detail, the terminal 611 and the electronic device 621 may have the same identification information, that is, the same identification (ID) number so as to show that they are owned by the same user.

The gateway 670 is a network connectivity device for connecting the terminal end 610 and the application provision server 630, and the application provision server 630, the terminal end 610, and the storage device 650 may be connected to one another via the gateway 670. In detail, the gateway 670 may relay communication between the terminal end 610, the application provision server 630, and the storage device 650. That is, the gateway 670 is a network connectivity device for relaying different networks.

When the terminal 611 included in the terminal end 610 outputs a request to transmit a predetermined application, the gateway 670 may receive the request to transmit the predetermined application and transmit the predetermined application to the application provision server 630. Also, the application provision server 630 transmits the predetermined application to the gateway 670. The gateway 670 may decompress the received predetermined application and store the decompressed predetermined application in the storage device 650.

In detail, the gateway 670 may include a control unit 671 and an interface unit 672. Also, the gateway 670 may be included in the storage device 650. In FIG. 6, the gateway 670 is independent from the storage device 650, and is connected to the storage unit 650 via a predetermined network.

The terminal 611, for example, included in the terminal end 610, uses the interface unit 672 to request transmission of a predetermined application.

The control unit 671 receives a predetermined application from the application provision server 630 according to the request to transmit the predetermined application received from the interface unit 672. In addition, the control unit 671 decompresses the predetermined application and stores the decompressed predetermined application in the storage device 650. Also, the control unit 671 extracts from the predetermined application a script file for controlling execution of the predetermined application, thereby updating the list of applications stored in the storage device 650. The updated list is the second App list described above with reference to FIG. 4. The second App list may be stored in the gateway 670 or the storage device 650.

Figure 12:
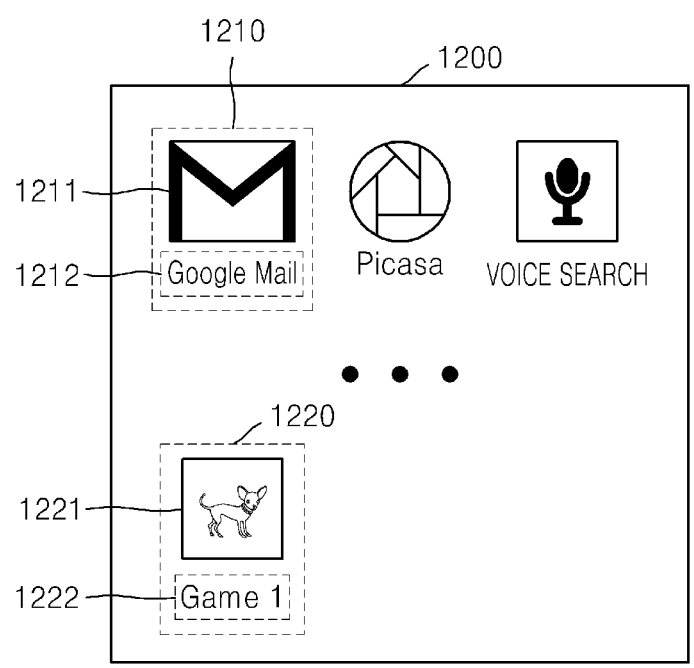
FIG. 12 is a view for explaining a script file extracted in a method of using an application according to another exemplary embodiment.

Alternatively, the control unit 671 may generate a menu page, via which an application stored in the storage device 650 may be selected, as a second App list. The menu page generated by the control unit 671 may be generated as shown in FIG. 12. The user may select at least one application included in the second App list via the menu page.

The application provision server 630 may include at least one server, from among, for example, first server 631, second server 632, third server 633 which provide web applications.

The storage device 650 may include a cloud server 651 that stores decompressed applications.

For example, the gateway 670 may operate as follows. When the terminal 611 requests to transmit a predetermined application, the gateway 670 accesses the application provision server 630 to receive a predetermined application. The control unit 671 decompresses the predetermined application and stores the decompressed predetermined application in the storage device 650. Then, the decompressed predetermined application is transmitted from the storage device 650 automatically or according to a request of the terminal 611, to the terminal 611 so that the terminal 611 may execute the predetermined application.

Also, when another terminal (e.g., the first device 622) requests transmission of a decompressed predetermined application, whether the terminal 611 that has requested a predetermined application for the first time and another terminal (e.g., the first device 622) have the same identification information corresponding to the same user may be determined. Also, when the terminal 611 and the other terminal (e.g., the first device 622) have the same identification information, a decompressed predetermined application may be transmitted to the other terminal (e.g., the first device 622). That is, when a user A owns both the terminal 611, which is a smartphone, and the other terminal (e.g., the first device 622), the terminal 611 and the other terminal (e.g., the first device 622) may have the same identification information. In this case, a plurality of terminals owned by the same user may commonly use a predetermined application, thereby increasing user convenience.

Operations of the gateway 670 and the communication system 600 will be described in detail below with reference to FIGS. 7 and 13.

Figure 7:
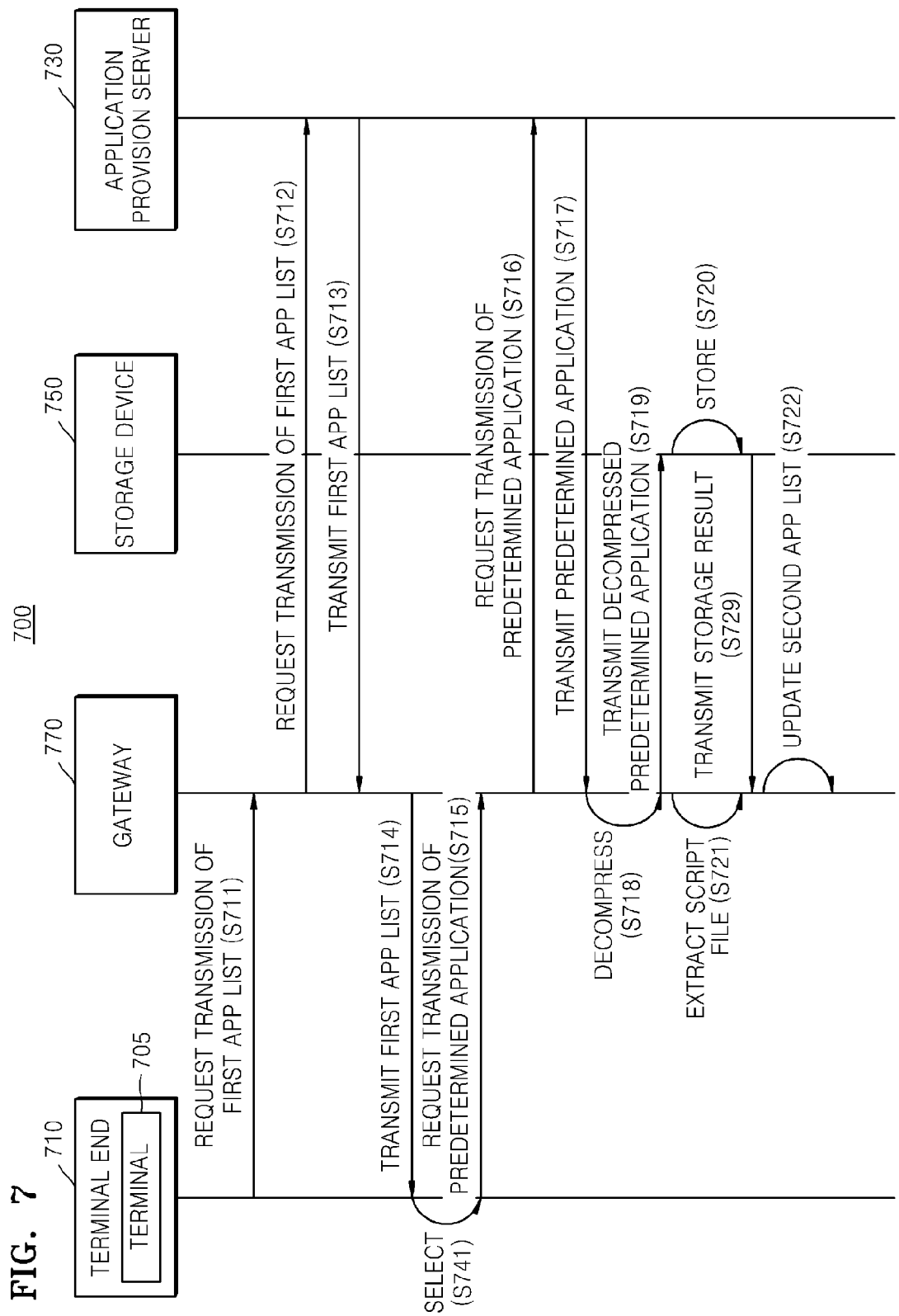
FIG. 7 is a flowchart illustrating a method of using an application according to another exemplary embodiment.

FIG. 7 is a flowchart illustrating a method 700 of using an application according to another exemplary embodiment. The method illustrated in FIG. 7 may be performed using the gateway 670 and the communication system 600. In detail, a terminal end 710, an application provision server 730, a storage device 750, and a gateway 770 respectively correspond to the terminal end 610, the application provision server 630, the storage device 650, and the gateway 670. Also, the terminal 705 corresponds to the terminal 611. Accordingly, the description already provided with reference to FIG. 6 will not be repeated here.

In operation S715, the terminal 705 requests the gateway 770 to transmit a predetermined application. Accordingly, the gateway 770 receives a request to transmit a predetermined application.

In operation S716, the gateway 770 transmits the received request to transmit the predetermined application to the application provision server 730.

According to the request to transmit the predetermined application transmitted in operation S716, the gateway 770 receives a predetermined application from the application provision server 730 in operation S717.

At least one of the gateway 770 and the storage device 750 decompresses the received predetermined application in operation S717. In detail, in operation S718, the gateway 770 may decompress the predetermined application received in operation S717.

Alternatively, the storage device 750, rather than the gateway 770, may decompress the predetermined application (operation not shown). In detail, the gateway 770 may transmit the predetermined application received in operation S717, and the storage device 750 may decompress and store the application.

In operation S720, the storage device 750 stores the decompressed predetermined application.

In addition, according to the method 700, in operation S729, information about storage results of operation S720 may be transmitted to the gateway 770. The information about storage results includes the application stored in operation S720, and may include a list of applications stored by using the application provision server 730.

In operation S721, after operation S718, the gateway 770 may extract a script file from the predetermined application that is generated and decompressed in operation S718.

In operation S722, a second App list is updated by using the script file extracted in operation S721. The second App list is a list of applications stored in the storage device 750, and is similar to the second App list described with reference to operation S418 of FIG. 4.

While operations S721 and S722 are performed in the gateway 770 in FIG. 7, operations S721 and S722 may also be performed in the storage device 750.

In addition, the method 700 may further include operations S711, S712, S713, S714, and S741.

In operation S711, the terminal 705 may request the gateway 770 to transmit a first App list. The first App list is an application list including applications provided by the application provision server 730, and is similar to the first App list described with reference to operation S411 of FIG. 4.

According to the request of operation S711, the gateway 770 requests the application provision server 730 to transmit the first App list in operation S712.

In operation S714, the gateway 770 receives the first App list, and transmits the received first App list to the terminal 705. By using the first App list received in operation S714, the user may select an application that a user wants to download, in operation S741. Transmission of the selected application may be requested in operation S715.

Figure 8:
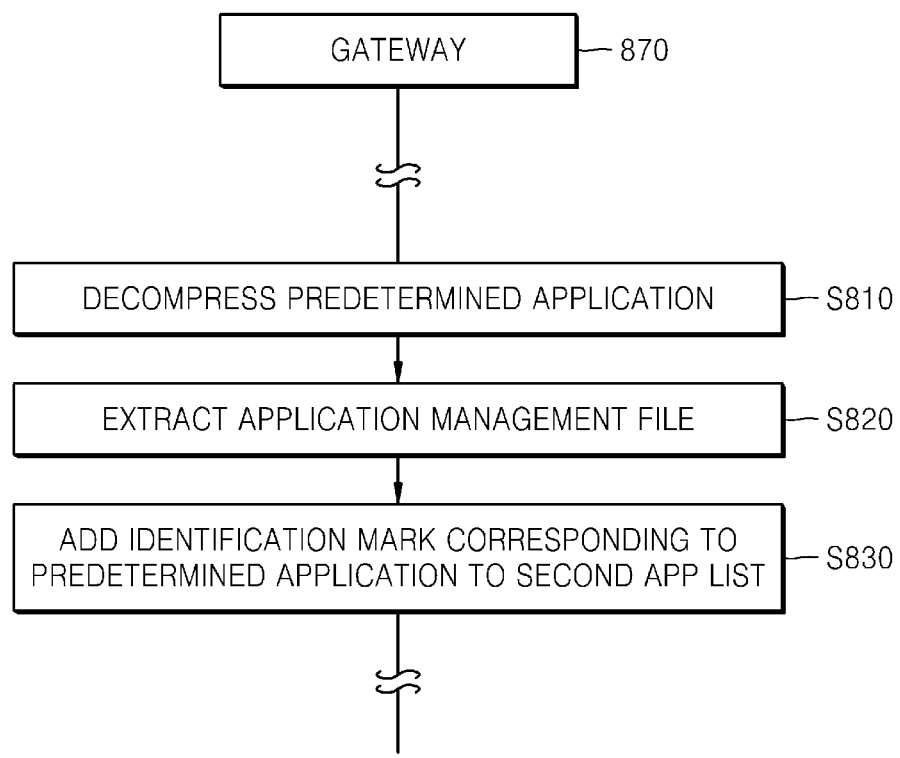
FIG. 8 is a flowchart of an operation of updating a second app list in a method of using an application according to an exemplary embodiment.

FIG. 8 is a flowchart of an operation of updating a second App list in a method of using an application according to another exemplary embodiment. A gateway 870 of FIG. 8 corresponds to the gateway 770 described with reference to FIG. 7, and operations S810, S820, and S830 respectively correspond to operations S718, S721, and S722 described with reference to FIG. 7. Accordingly, the description already provided with reference to FIG. 7 will not be repeated here.

In operation S810, the gateway 870 decompresses a predetermined application, and in operation S820, a script file, which is an application management file, is extracted from the decompressed predetermined application.

The script file may include a manifest file included in application data of the decompressed application. The manifest file may be written as a text file, a Markup Language, Javascript, or CSS. The manifest file extracted in operation S820 will be described in detail with reference to FIGS. 9 through 11.

FIG. 9 is a view for explaining a script file extracted in a method of using an application according to an exemplary embodiment. In detail, referring to FIG. 9, a manifest file of a CRX hosted webapp 900 is illustrated.

The CRX hosted webapp 900 may include an application name 910, a uniform resource locator (URL) address 920 for accessing an application, and icon information 930 representing an application.

In operation S830, the gateway 870 updates a second App list using a script file extracted in operation S820. In detail, in the script file extracted in operation S820, at least one of an application name, an identification mark, access information or location information for accessing an application, and an icon indicating a predetermined application, may be added to the second App list to thereby update the second App list.

FIG. 12 is a view for explaining a script file extracted in a method of using an application according to an exemplary embodiment, and shows an updated second App list.

Referring to FIG. 12, a second App list 1200 updated in operation S830 may include identification marks of applications stored in the storage device 750, such as icons or names.

If a script file extracted in operation S820 is the manifest file 900 illustrated in FIG. 9, an identification mark 1210 representing an application may be added to the second App list 1200 by using the application name 910 and the icon information 930 representing an application. In the identification mark 1210, "Google Mail" 1212 may be marked according to the application name 910, and an icon 1211 representing Google Mail may be included. When the icon 1211 is clicked, http://mail.google.com/mail/ is accessed according to the extracted URL address 920 so as to use the Google mail application.

FIG. 10 is a view for explaining a script file extracted in a method of using an application according to an exemplary embodiment. In detail, referring to FIG. 10, a manifest file of a CRX packaged webapp is illustrated.

The manifest file 1000 of the CRX packaged webapp may include an application name 1010, location information 1020 for accessing an application, and icon information 1030 representing an application.

In operation S830, the gateway 870 updates the second App list by using the extracted script file. In detail, in the script file extracted in operation S820, at least one of an application name, an identification mark, connection information, and an icon corresponding to a predetermined application is added to the second App list 1200 to update the second App list 1200.

If the script file extracted in operation S820 is the manifest file 1000 illustrated in FIG. 10, an identification mark 1220 representing an application may be added to the second App list 1200 by using the application name 1010 and the icon information 1030. 'Game 1' 1222 may be displayed on the identification mark 1220 according to the application name 1010, and an icon 1221 denoting the corresponding game may be included. By clicking the icon 1221, a corresponding game application may be used by accessing main.html according to the extracted location information 1020.

FIG. 11 is a view for explaining a script file extracted in a method of using an application according to an exemplary embodiment. In detail, referring to FIG. 11, a manifest file 1100 of a widget WGT is illustrated.

The manifest file 1100 of the widget WGT may include an application name 1100, icon information 1120 representing an application and via which the application may be accessed, and location information 1130 for accessing the application.

Similar to the exemplary embodiment described with reference to FIGS. 9 and 10, the second App list 1200 may be updated by using the manifest file 1100 illustrated in FIG. 11.

Figure 13:
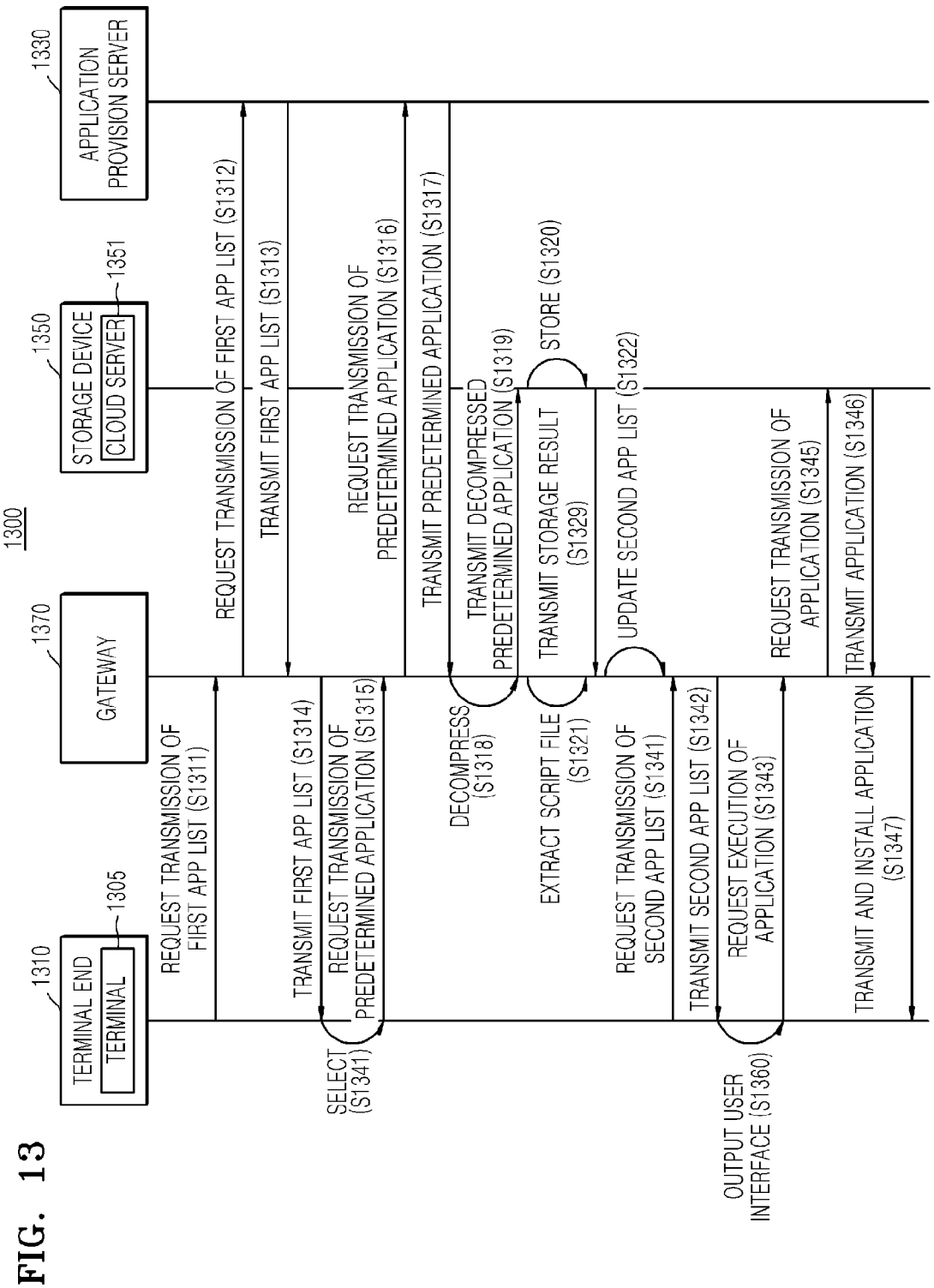
FIG. 13 is a flowchart illustrating a method of using an application according to another exemplary embodiment.

FIG. 13 is a flowchart illustrating a method 1300 of using an application according to an exemplary embodiment.

Referring to FIG. 13, a terminal end 1310, an application provision server 1330, a storage device 1350, and a gateway 1370 respectively correspond to the terminal end 710, the application provision server 730, the storage device 750, and the gateway 770 of FIG. 7. A terminal 1305 corresponds to the terminal 705. Also, operations S1311, S1312, S1313, S1314, S1341, S1315, S1316, S1317, S1318, S1319, S1320, S1321, S1322, and S1329 respectively correspond to operations S711, S712, S713, S714, S741, S715, S716, S717, S718, S719, S720, S721, S722, and S729. Thus, the description already provided with reference to FIG. 7 will not be repeated here.

Unlike the method 700, the method 1300 may further include at least one of operations S1341, S1342, S1343, S1345, S1346, S1347, and S1360.

In operation S1341, the terminal 1305 may request the gateway 1370 to transmit a second App list.

In operation S1342, according to the request of operation S1341, the gateway 1370 transmits the updated second App list 1200 that is updated in operation S1322, to the terminal 1305.

In operation S1360, the terminal 1305 which has received the second App list 1200 may output a user interface via which at least one of an application that is stored in the storage unit 1350 and corresponds to the second App list 1200 may be selected. The user may select at least one application included in the second App list 1200 via the user interface output in operation S1360. The second App list 1200 output in operation S1360 may be the second App list 1200 illustrated in FIG. 12.

In operation S1343, the terminal 1305 may request the gateway 1370 to execute an application.

In operation S1345, according to the request of execution of operation S1343, the gateway 1370 requests the storage unit 1350 to transmit a decompressed application.

In operation S1346, in response to the request received in operation S1345, the requested decompressed application is transmitted to the gateway 1370.

In operation S1347, the gateway 1370 transmits the decompressed application received in operation S1346 to the terminal 1305. The terminal 1305 may receive the received application and execute the received application.

While exemplary embodiments have been particularly shown and described, it will be understood by those of ordinary skill in the art that various changes in form and details may be made therein without departing from the spirit and scope of the present invention as defined by the following claims.

What is claimed is:

1. A method of providing a web application to at least one terminal, the method comprising:
   receiving from an application provision server a web application in a compressed form that is executable by a predetermined type of a browser or a predetermined type of an operating system;
   decompressing the web application;
   storing the decompressed web application in a storage device;
   extracting a manifest file of the web application from the decompressed web application;
   updating a list of web applications stored in the storage device using the manifest file; and
   transmitting the list to the at least one terminal so that the terminal uses the web applications stored in the storage device regardless of a browser or an operating system of the at least one terminal, wherein the storing the web application in the storage device comprises storing the decompressed web application in a cloud server.

2. The method of claim 1, wherein the decompressed web application has a data format independent from a browser installed in the at least one terminal.

3. The method of claim 1, wherein the decompressed web application has a data format independent from a browser installed in the terminal and is at least one selected from the group comprising Internet Explorer, Opera, Chrome, Chromium, Firefox, and Dolphin.

4. The method of claim 1, wherein the decompressed web application has a data format independent from an operating system installed in the at least one terminal.

5. The method of claim 1, wherein the decompressing the web application comprises:
transmitting the web application to the storage device via the gateway; and
decompressing the web application via the storage device.

6. The method of claim 1, wherein transmitting the list comprises
transmitting the list in response to receiving a request to transmit the list from the at least one terminal; and
outputting a user interface displaying the list of web applications and selecting at least one of the web applications stored in the storage device, via the at least one terminal.

7. The method of claim 6, further comprising receiving a request from the at least one terminal to execute the web application in response to the web application being selected via a user interface of the at least one terminal, the user interface being generated based on the list.

8. The method of claim 7, further comprising:
transmitting the decompressed web application to the at least one terminal in response to receiving the request.

9. The method of claim 1, wherein the decompressing comprises decompressing the web application via the at least one terminal.

10. The method of claim 1, wherein the decompressing comprises decompressing the web application via the storage device.

11. A gateway comprising:
a memory; and
a central processing unit (CPU) configured to execute instructions stored in the memory, the instructions causing the CPU to:
receive from an application provision server a web application in a compressed form that is executable by a predetermined type browser or a predetermined type an operating system,
decompress the web application and store the decompressed web application in a storage device,
extract a manifest file of the web application from the decompressed web application,
update a list of web applications stored in the storage device using the manifest file, and
transmit the list to the at least one terminal so that the at least one terminal uses the web applications stored in the storage device regardless of a browser or an operating system of the at least one terminal,
wherein the storage device is a cloud server.

12. The gateway of claim 11, wherein the decompressed web application has a data format independent from a browser installed in the at least one terminal.

13. The gateway of claim 11, wherein the decompressed web application has a data format independent from an operating system installed in the at least one terminal.

14. The gateway of claim 11, wherein the decompressed web application is data written in at least one selected from the group comprising Markup Language, Javascript, and Cascading Style Sheet (CSS).

15. The gateway of claim 11, wherein the instructions further cause the CPU to generate a menu page including the list of web applications, from which at least one web application stored in the storage device is selected.

16. The gateway of claim 11, wherein the list of web applications comprises at least one selected from the group comprising an icon, an identification mark, location information of the web application, and an application name corresponding to a web application.

17. The gateway of claim 11, wherein the gateway is included in the storage device.

18. The gateway of claim 11, wherein the instructions further cause the CPU to, in response to receiving a request to execute the web application from the at least one terminal, determine whether the at least one terminal, which has requested execution of the web application, has same identification information as a user of the at least one terminal that has requested transmission of the web application.

19. The gateway of claim 18, wherein the instructions further cause the CPU to, when the at least one terminal has the same identification information corresponding to the user of the at least one terminal that has requested transmission of the web application, transmit the decompressed web application to the at least one terminal that has requested transmission of the web application.

20. A terminal comprising:
a memory; and
a central processing unit (CPU) configured to execute instructions stored in the memory, the instructions causing the CPU to:
generate a transmission request signal requesting transmission of a web application,
transmit the transmission request signal to an application provision server,
receive from the application provision server the web application in a compressed form that is executable by a predetermined type of a browser or a predetermined type of an operating system,
decompress the web application,
send the decompressed web application to a storage device that is configured to, in response to receiving the decompressed web application, store the decompressed web application in the storage device, and
receive from the storage device a list of web applications stored in the storage device,
wherein the transmission request signal requests storage of the web application in the storage device,
wherein the list of web applications is updated using a manifest file extracted from the web application that has been decompressed, and
wherein the storage device is a cloud server.

21. A terminal comprising:
a memory; and
a central processing unit (CPU) configured to execute instructions stored in the memory, the instructions causing the CPU to:
generate a transmission request signal requesting transmission of a web application,
transmit the transmission request signal to a gateway that is configured to, in response to receiving the transmission request signal, receive from an application provision server the web application in a compressed form that is executable by a predetermined type of a browser or a predetermined type of an operating system, decompress the web application, and store the decompressed web application in a storage device, update a list of web applications stored in the storage device using a manifest file extracted from the decompressed web application, and receive from the gateway a list of web applications stored in the storage device, wherein the transmission request signal requests storage of the web application which is decompressed in the storage device, wherein the list of web applications is updated using a manifest file extracted from the decompressed web application, wherein the storage device is a cloud server.

22. A storage device comprising:

a memory; and a central processing unit (CPU) to execute instructions stored in the memory, the instructions causing the CPU to:

receive a web application in a compressed format provided by an application provision server, the compressed format being executable by a predetermined type of a browser or a predetermined type of an operating system, decompress the web application;

store the web application in a decompressed format according to a request to transmit the web application in the storage device, extract a manifest file of the web application from the stored web application in the decompressed format, update a list of web applications stored in the storage device using the manifest file, and transmit the undated list to at least one terminal so that the at least one terminal uses the web applications stored in the storage device regardless of a browser or an operating system of the at least one terminal, wherein the storage device is a cloud server.

23. A communication system comprising:

at least one terminal comprising at least one processor configured to execute instructions stored in a memory of the terminal, the instructions causing the at least one terminal to request a gateway to transmit a web application; and a gateway comprising at least one processor configured to execute instructions stored in a memory of the gateway, the instructions causing the gateway to, in response to receiving the request from the at least one terminal:

receive the web application in a compressed form that is executable by a predetermined type of a browser or a predetermined type of an operating system from an application provision server, decompress the received web application in the compressed format, store the decompressed web application in a storage device, extract a manifest file of the web application from the decompressed web application, and update a list of web applications stored in the storage device using the manifest file; and transmit the updated list to the at least one terminal so that the at least one terminal uses the web applications stored in the storage device regardless of a browser or an operating system of the at least one terminal, wherein the storage device is a cloud server.

* * * * *